United States Patent
Sata

[19]

[11] Patent Number: 5,517,067
[45] Date of Patent: May 14, 1996

[54] MINIATURE D.C. MOTOR PROVIDED WITH ROTATION DETECTOR

[75] Inventor: Nobuyuki Sata, Chiba, Japan

[73] Assignee: Mabuchi Motor Co., Ltd., Matsudo, Japan

[21] Appl. No.: 169,196

[22] Filed: Dec. 20, 1993

[30] Foreign Application Priority Data

May 27, 1993 [JP] Japan .................................. 5-148458

[51] Int. Cl.⁶ ................................................. H02K 11/00
[52] U.S. Cl. .................................. 310/68 B; 310/40 MM
[58] Field of Search ........................ 310/40 MM, 68 B, 310/168, 169, 170, 171; 324/207.15, 207.25

[56] References Cited

U.S. PATENT DOCUMENTS

| | | | |
|---|---|---|---|
| 3,967,200 | 6/1976 | Tetsugu et al. | 310/168 |
| 4,056,747 | 11/1977 | Orris et al. | 310/168 |
| 4,138,642 | 2/1979 | Mohr | 324/173 |
| 4,731,591 | 3/1988 | Weigand | 324/207.15 |
| 4,783,609 | 11/1988 | Sugiyama et al. | 310/168 |
| 4,829,254 | 5/1989 | Baines | 324/167 |
| 4,914,713 | 4/1990 | Mueller et al. | 310/68 B |
| 5,029,286 | 7/1991 | Kirschner | 324/207.25 |
| 5,034,640 | 7/1991 | Shimizu | 310/40 MM |
| 5,086,243 | 2/1992 | Hofmann | 310/68 B |

FOREIGN PATENT DOCUMENTS

| | | | |
|---|---|---|---|
| 0529131 | 8/1991 | European Pat. Off. . | |
| 2680920 | 8/1992 | France . | |
| 2638954 | 8/1976 | Germany . | |
| 4142181 | 12/1991 | Germany . | |
| 63-187567 | 5/1987 | Japan . | |
| 4-127858 | 4/1992 | Japan | 310/68 B |
| 5-3225 | 1/1993 | Japan . | |

Primary Examiner—Clayton E. LaBalle
Attorney, Agent, or Firm—Armstrong, Westerman, Hattori, McLeland & Naughton

[57] ABSTRACT

A miniature D.C. motor has a casing in which magnets are disposed and a rotor is disposed inside the magnets. The rotating condition is detected by a rotation detector which comprises an inductor and a capacitor. The inductor detects leaking fluxes externally from the casing among fluxes created by mutual operations of the magnets and an armature and converts a change of the leaking fluxes into electric signals. The capacitor is electrically connected to the inductor so as to constitute a resonance circuit. The resonance circuit is mounted on an outer surface of the casing. A resonance frequency of the resonance circuit is made so as to correspond to a frequency to be generated for a rotating time of the armature.

23 Claims, 12 Drawing Sheets

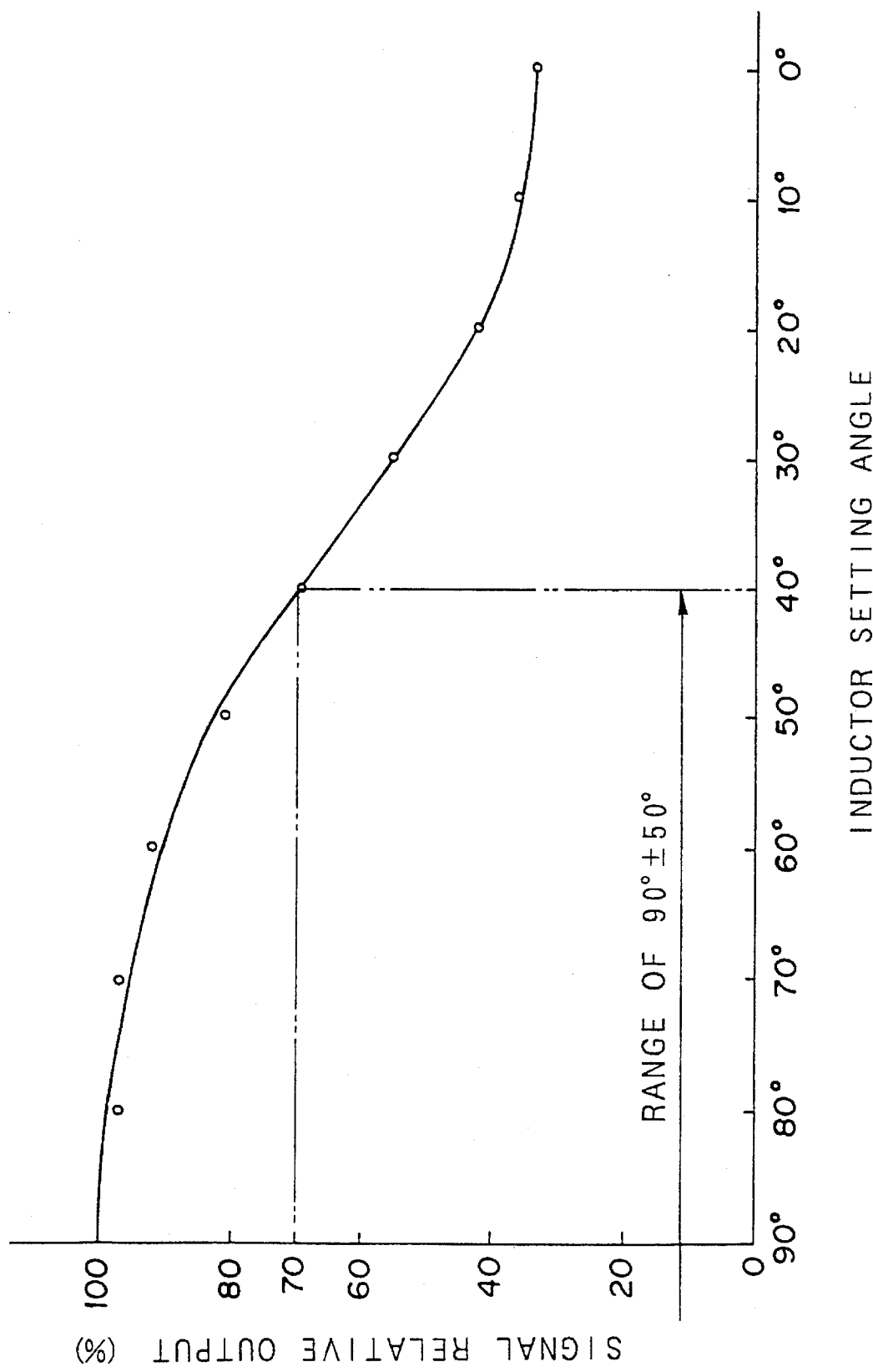

MINIATURE D.C. MOTOR PROVIDED WITH ROTATION DETECTOR

BACKGROUND OF THE INVENTION

The present invention relates to a miniature D.C. (direct current) motor provided with a rotation detector. The detector detects a rotating condition such as revolving speed of the motor utilized for an actuator for driving, for example, a power window of an automobile.

Miniature D.C. motors have been widely applied to automobiles in recent years, and this application tends to increase as the electronics technology progresses. For example, a miniature D.C. motor is utilized for operating the power window which automatically opens and closes window glasses of the automobile. Further the opening and closing operations of the window glasses are performed in a conventional technology by simply opening and closing the window glasses at full length. Recently it has been required to open and close the window glasses in various modes. For example, it requires for window glasses to ascend or descend with small pitches. In other cases the window glass would stop instantly in its ascending operation or open in a safety view point when a hand or a neck of a person is nipped between the window glass and the window frame.

As described above, for the motor utilized for the actuator to drive the power window in various modes, it is necessary to detect the rotating condition of the motor by a rotation detector. The rotating condition such as sum of revolutions of the motor and revolving speed thereof is detected for detecting the positions of the window glasses and the opening and closing speeds.

In the known art, there is a miniature D.C. motor provided with a rotation detector which is accommodated inside the motor. The motor is provided with a casing in which a permanent magnet is mounted and a rotor is disposed in the permanent magnet. The rotor has a rotation shaft supported to be rotatable by two bearings mounted in the casing and a commutator is mounted to the rotation shaft. A brush fixed to the casing is slidingly engaged with the commutator.

A rotation detecting ring of the rotation detector is mounted to the rotation shaft. The rotation detecting ring is disposed adjacent to the commutator and has substantially the same structure as that of the commutator. On the other hand, a rotation detecting brush is attached to the casing and slidingly engaged with the rotation detecting ring. Connecting terminals are provided for a cover of the casing and connected to the brush and the rotation detecting brush respectively through lead wires embedded in the casing. According to these structures, the revolving speed of the rotor is detected through ON-OFF signals transmitted from the rotation detecting ring and the rotation detecting brush constituting the rotation detector.

According to a structure of the conventional miniature D.C. motor, the rotation detecting brush and the ring are disposed inside the casing. Therefore, the inside arrangement or structure thereof is complicated and the axial length of the motor itself is made large in comparison with a miniature D.C. motor having no rotation detector. In nature, it is required to assemble the actuator in which such motor is mounted in a small space. It is not desired to increase the outer dimension of the motor caused by the additional arrangement of the rotation detector. If the motor provided with the rotation detector were designed to be forcibly assembled without changing its outer dimension, this design would adversely affect the arrangement of the commutator and the brush which are essential for the structure of the motor, and would result in degradation of the motor performance.

Further, in the conventional technique the rotation detector is arranged inside the motor casing so that the structures of the motor itself and the numbers of the lead wires are different between the cases of the location of the rotation detector and of no location thereof. It is therefore difficult to commonly use motor parts such as the casing, the shaft and the lead wires in both cases. Moreover, in the case of the location of the rotation detector, it is necessary to embed the lead wires in the casing, accordingly such portions at which lead wires are embedded must be perfectly sealed. Thus the case involves a problem of a water-proof structure which is particularly important for the miniature D.C. motor mounted to the automobile. In the conventional structure, the contact-type rotation detecting ring contacts the rotation detecting brush. It is necessary to pay attention to this portion in view of friction or the like, which may render short the life of usage of these members.

SUMMARY OF THE INVENTION

One object of the present invention is to substantially eliminate defects or drawbacks encountered in the prior art and to provide a miniature D.C. motor provided with a rotation detector with simple structure and short axial length. The rotation detector is capable of detecting the rotating condition of the motor without degrading the performance of the motor.

Another object of the invention is to provide a miniature D.C. motor which is commonly utilized whether a rotation detector is provided or not for the motor.

A further object of the invention is to provide a miniature D.C. motor with an improved water-proof structured capability.

A still further object of the invention is to provide a miniature D.C. motor having less fault and having prospective life time of a rotation detector provided for the motor.

These and other objects can be achieved according to the present invention by providing a miniature D.C. motor having a casing in which magnets are disposed, a rotor having a rotation shaft is disposed inside the magnets to be rotatable, and a rotation detector detecting a rotation condition of the rotor. The rotation detector comprises an inductor for detecting magnetic fluxes leaking externally from the casing among the magnetic fluxes created by mutual operations of the magnets and an armature of the rotor and for converting a change of the leaking magnetic fluxes into electric signals, and a capacitor electrically connected to the inductor so as to constitute a resonance circuit. The resonance circuit is mounted on an outer surface of the casing, wherein a resonance frequency of the resonance circuit is made so as to correspond to a value of a frequency to be generated for a rotating time of the armature and the electric signals are generated by the resonance circuit.

In preferred embodiments, the resonance circuit is composed of a parallel resonance circuit in which the inductor and the capacitor are connected in parallel to each other.

The rotation detector has a unit structure to be detachably mounted on the outer surface of the casing. The casing has axial two end portions and the rotation detector is mounted on an outer end surface of one of the end portions opposite to another side at which a commutator is mounted on the rotation shaft.

The inductor and the capacitor are fixed to a bottom plate of a sensor case having a hollow box-shaped structure formed out of an electrically insulating material.

The magnets are composed of a pair of permanent magnets mounted on an inner peripheral surface of the casing. Each of these permanent magnets is formed in an arc segment shape and is formed out of a magnetic material such as hard ferrite. A center of the inductor is disposed to an angled position in a range of 90°±50° in a case where one direction of a central line connecting centers of the respective permanent magnets is assumed as 0(zero)-angled position and another direction normal to this one direction is assumed as 90-angled position. The inductor is arranged in the 90-angled position and the ferrite core of the inductor is directed to a direction parallel to the central line connecting the centers of the permanent magnets.

The rotation detector is mounted to the motor for an actuator for which a control is required by detecting a motor rotating condition. The actuator is utilized for a power window of an automobile.

The casing comprises a bottomed hollow cylindrical housing having an opening and a cover member applied to the opening. The cover member is formed out of an electrically insulating material.

The housing has an axial one end to a central portion at which a recessed portion is formed so as to protrude externally at its bottom. A bearing is accommodated in the recessed portion, and the cover member has a central portion at which the other bearing is mounted. The rotation shaft is rotatably supported by these bearings.

The inductor and the capacitor are secured on a bottom plate of a sensor case of a hollow box-shape structure formed out of an electrically insulating material. The externally protruded portion so as to form the recessed portion is integrally formed at the central portion of the axial one end portion of the housing. Another recessed portion is integrally formed at a central portion of the bottom plate of the sensor case so as to have an inner shape corresponding to an outer shape of the protruded portion of the housing. Therefore, the sensor case is firmly secured to the outer end surface of the axial one end portion of the housing by fitting the protruded portion of the housing into the recessed portion of the bottom plate of the sensor case.

According to the rotation detector of the structures and characters, the change of the leaking magnetic fluxes is detected by the inductor positioned to the outer surface of the casing by utilizing the fact that the magnetic fluxes leaking externally from the casing are changed in response to the rotation of the rotor. Namely, by obliquely crossing the inductor with the leaking and changing magnetic fluxes, an electromagnetic induction is caused to thereby induce an induction electromotive force to the inductor itself and as a result electric signals are transmitted from the inductor. The electric signals represented by a wave form are amplified and generated from the resonance circuit including the inductor. Therefore, the detected signals having the wave form including reduced noise can be generated, and the rotating condition of the motor can be detected.

The natures and features of the invention will be made more clear from the following descriptions made with reference to the accompanying drawings.

BRIEF DESCRIPTION OF THE DRAWINGS

FIGS. 1 through 6 represent one embodiment of a miniature D.C. motor provided with a rotation detector according to the present invention, in which:

FIG. 1 shows an actuator, partially in section, provided with a miniature D.C. motor according to one embodiment of the invention;

FIG. 2 is a perspective view showing an outer appearance of the motor shown in FIG. 1;

FIG. 3 is a sectional view in an axial direction of the motor of FIG. 2, and showing an entire structure thereof;

FIG. 4 is a sectional view taken along the line IV—IV in FIG. 3;

FIG. 5 is an enlarged view of a portion of the motor of FIG. 2, and showing an inside of a sensor case thereof;

FIG. 6 is a block diagram of a rotation detector according to the invention;

FIGS. 7 through 16 are graphs showing data related to the rotation detector according to the invention of the structures shown in FIGS. 1 through 6, in which:

FIG. 7 is a graph showing a relationship between a revolving speed of the motor and a signal output voltage;

FIG. 8 is a graph showing a wave form of an output signal at a time of the revolving speed of 3000 RPM;

FIG. 9 is a graph showing a wave form of an output signal at a time of the revolving speed of 4000 RPM;

FIG. 10 is a graph showing a wave form of an output signal at a time of the revolving speed of 7000 RPM;

FIG. 11 is a graph showing a wave form of an output signal at a time of the revolving speed of 9000 RPM;

FIG. 12 shows a wave form of a motor driving current at a time of PWM modulation under an unloaded condition of the motor;

FIG. 13 shows a wave form of an output signal under the same condition as that of FIG. 12;

FIG. 14 shows a wave form of the motor driving current at a time of PWM modulation under a loaded condition of the motor;

FIG. 15 shows a wave form of an output signal under the same condition as that of FIG. 14; and FIG. 16 is a graph showing relationship between an inductor setting angle and a signal relative output.

DESCRIPTION OF THE PREFERRED EMBODIMENTS

One embodiment of a miniature D.C. motor according to the present invention will be described hereunder with reference to FIGS. 1 through 6.

Figure 1:
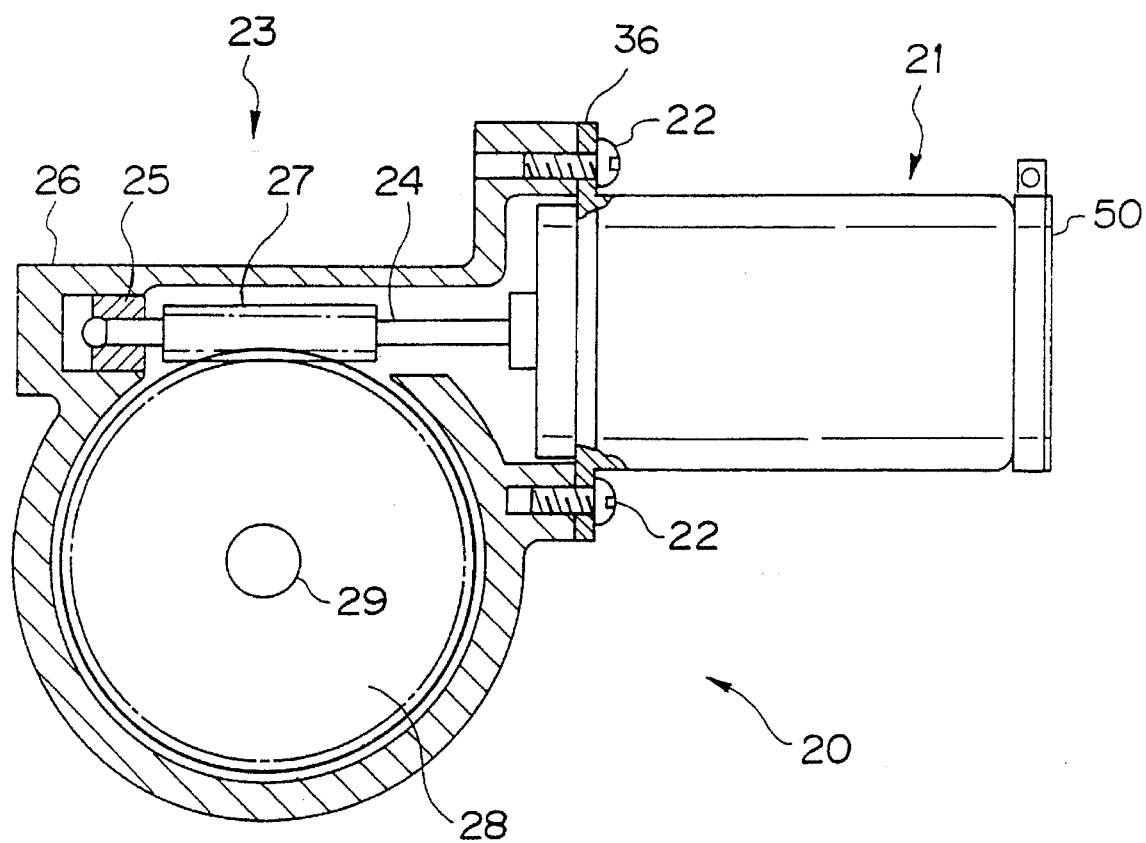

Referring to FIG. 1, a miniature D.C. motor 21 of the invention is provided for an actuator 20 utilized for a power window of an automobile. The motor 21 is secured to a speed reduction mechanism 23 by screws 22. A front end portion of a rotation shaft 24 of the motor 21 is supported through a bearing 25 to be rotatable by a body 26 of the speed reduction mechanism 23. A worm gear 27 is mounted to the rotation shaft 24 and a worm wheel 28 is rotatably secured to the body 26 to be engaged with the worm gear 27. An output power shaft 29 is disposed at a central portion of the worm wheel 28 in operative association therewith.

According to this structure, when the motor 21 is driven, its driving torque is transmitted through the rotation shaft 24 to the worm gear 27 and then to the worm wheel 28 to thereby rotate the power shaft 29. Finally the power shaft 29 automatically carries out opening and closing operations of window glass of the automobile through a power window operating mechanism.

Figure 2:
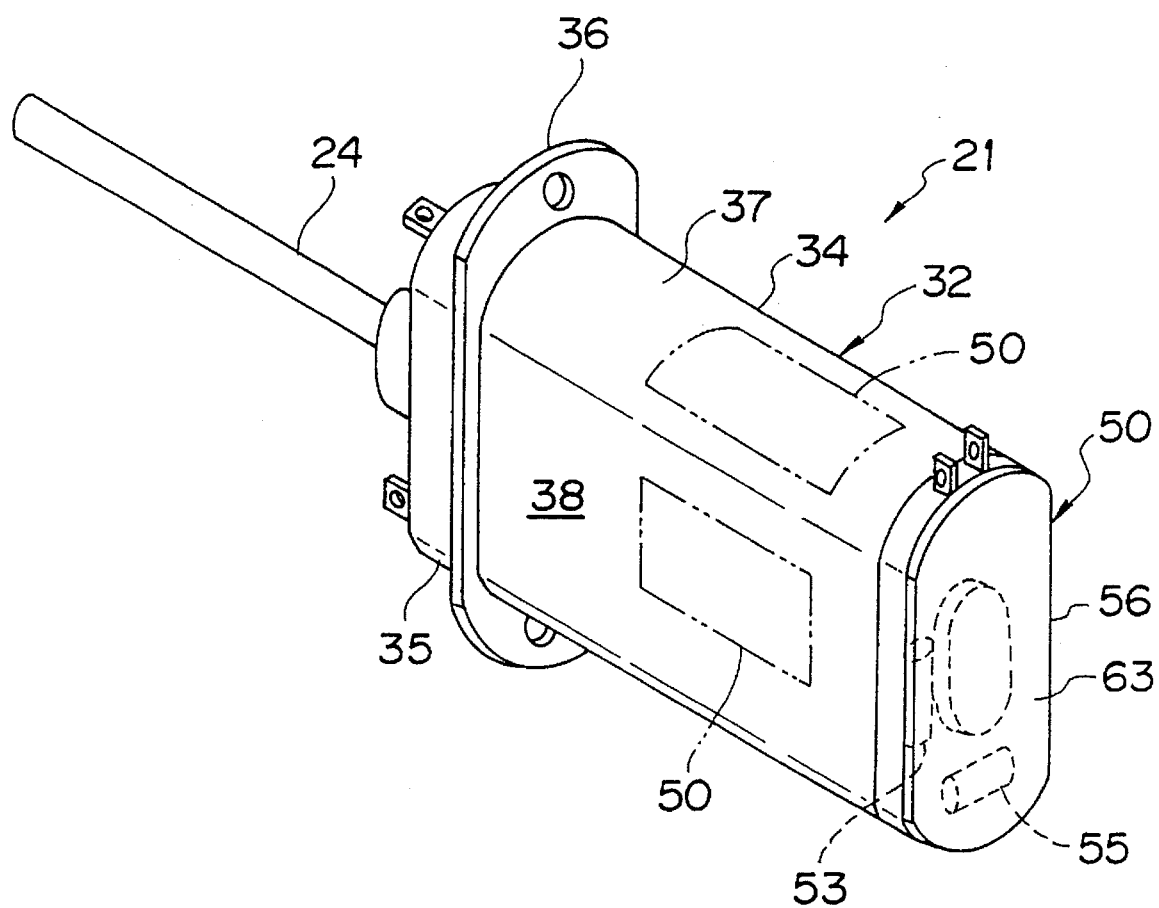
Figure 3:
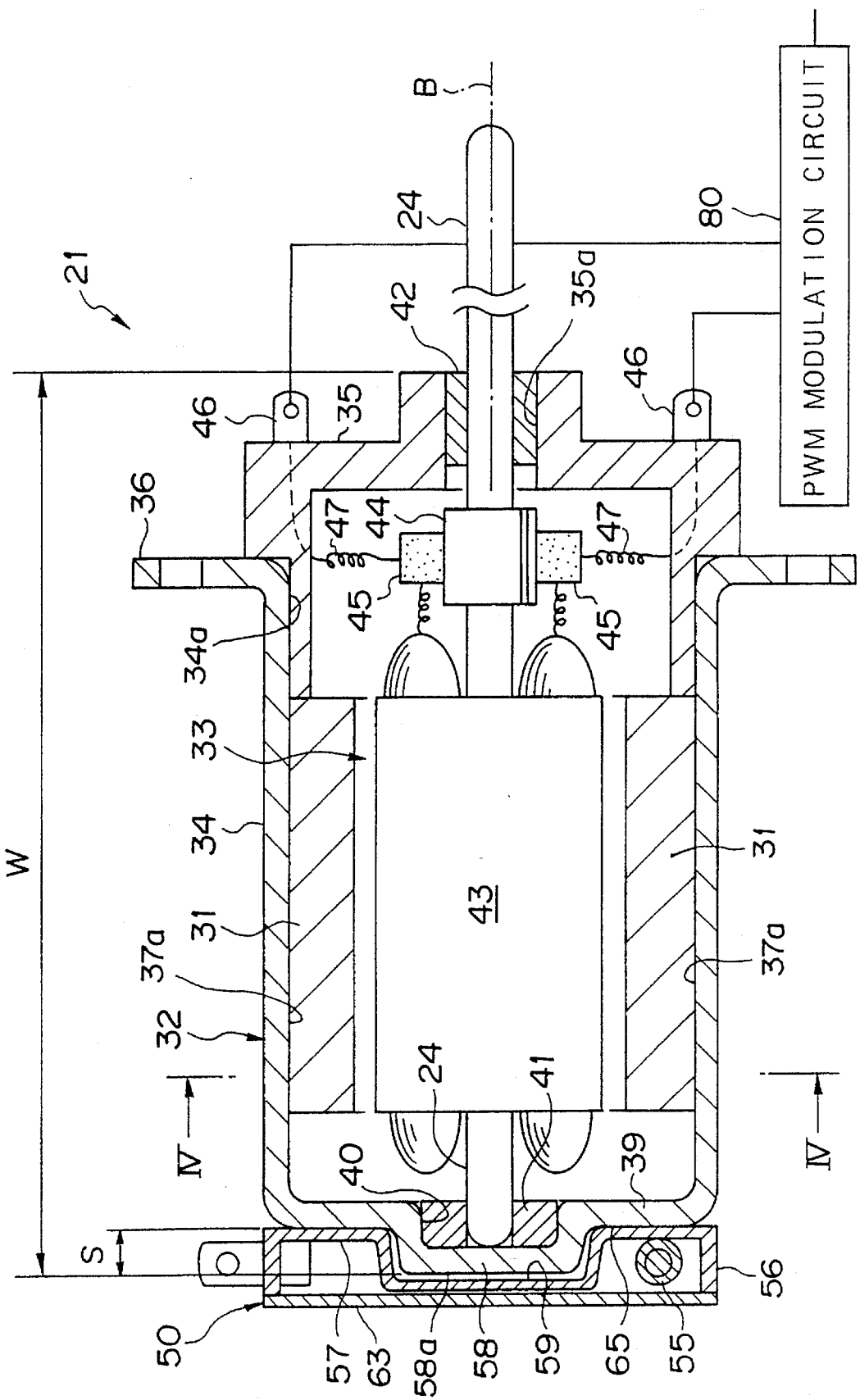
Figure 4:
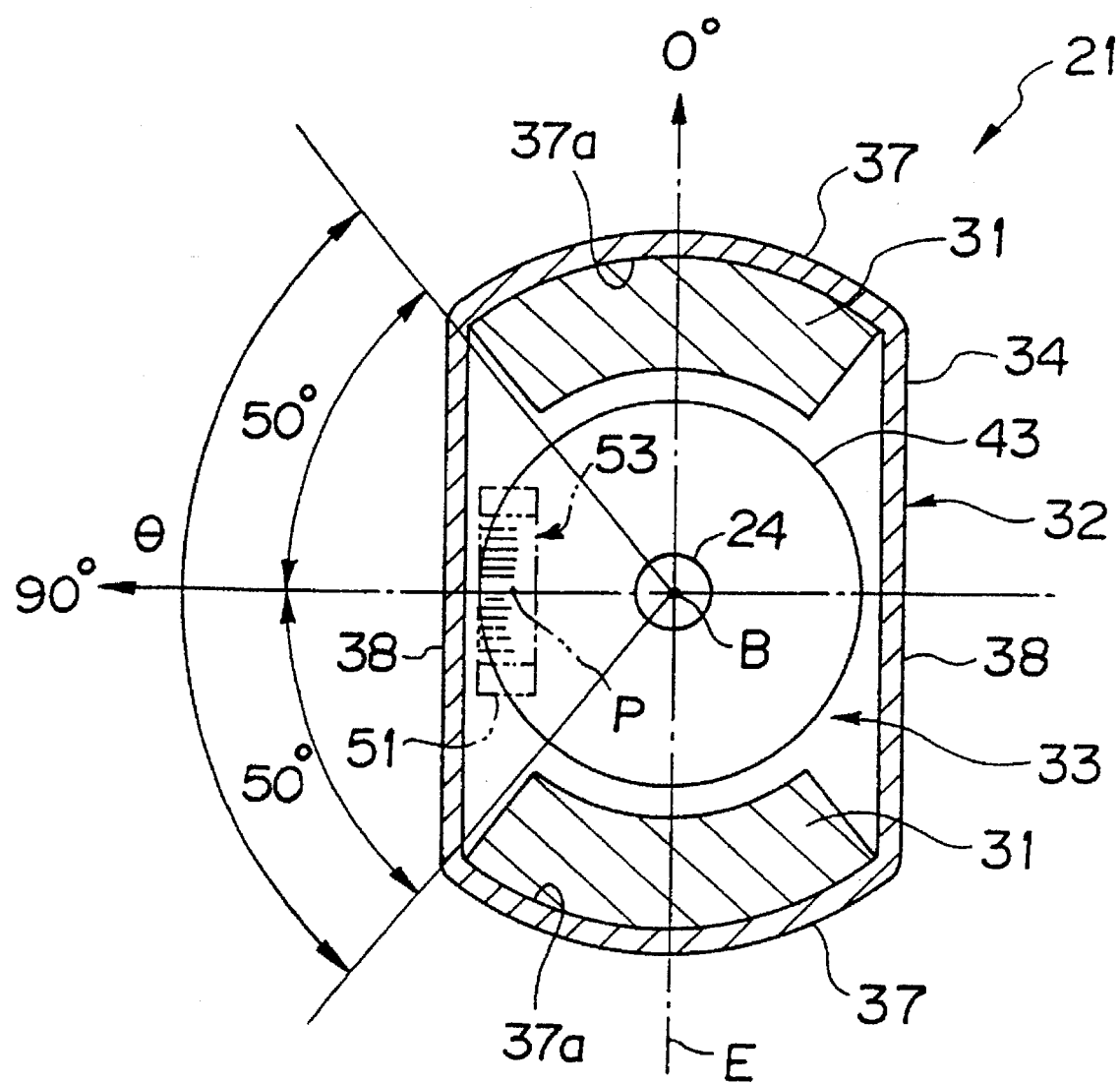

As shown in FIGS. 2 through 4, the motor 21 is provided with an outer casing 32 in which permanent magnets 31 as magnet means are mounted and a rotor 33 disposed rotatably inside the casing 32. The casing 32 is composed of a bottomed hollow cylindrical housing 34 formed out of a steel material to provide a rigid and firm structure, and a cover member 35. The cover member 35 is formed out of a resin material having an electrically insulating property or another electrically insulating material and fixedly fitted to an opening portion 34a of the housing 34. The housing 34 is formed integrally through a press mold working. The housing 34 is provided with a flange portion 36 secured to the body 26 by screws 22 (see FIG. 1).

The housing 34 and the cover member 35 have a pair of cylindrical portions 37 opposed to each other and a pair of flat portions 38. The flat portions 38 are integrated with the cylindrical portions 37 and are parallel with each other. As shown in FIG. 4, a pair of permanent magnets 31 are disposed in opposition to an inner peripheral surface 37a of the cylindrical portions 37. Each of these permanent magnets 31 is formed out of a magnetic material such as hard ferrite so as to provide an arc segment shape.

One axial end portion 39 of the housing 34, left-hand end as viewed in FIG. 3, is bent outwardly so as to provide a recessed portion 40 at substantially a central portion of the end portion 39. In the recessed portion 40, one bearing 41 is accommodated and secured thereto and the other bearing 42 is also accommodated in an opening 35a formed at the central portion of the cover member 35. The rotation shaft 24 is rotatably supported by these bearings 41 and 42.

The rotor 33 is provided with the rotation shaft 24 extending in a direction of the central line B being the center of the rotation. An armature 43 around which an armature winding is wound is secured to the rotation shaft 24. A rotating force is imparted to the armature 43 by the permanent magnets 31 and a commutator 44 which has a cylindrical shape and which is mounted to the rotation shaft 24 and electrically connected to the armature 43. The commutator 44 and the rotation shaft 24 are electrically insulated from each other. The armature 43 is disposed inside the permanent magnets 31 with a predetermined air-gap therebetween.

Plural brushes (for example two pairs of brushes) 45 formed out of an electrically conductive material are provided for the cover member 35 so as to carry out a slidable engagement with the commutator 44. Plural connecting terminals (for example two pairs of connecting terminals) 46 electrically connected to the respective brushes 45 are secured to the cover member 35.

Figure 5:
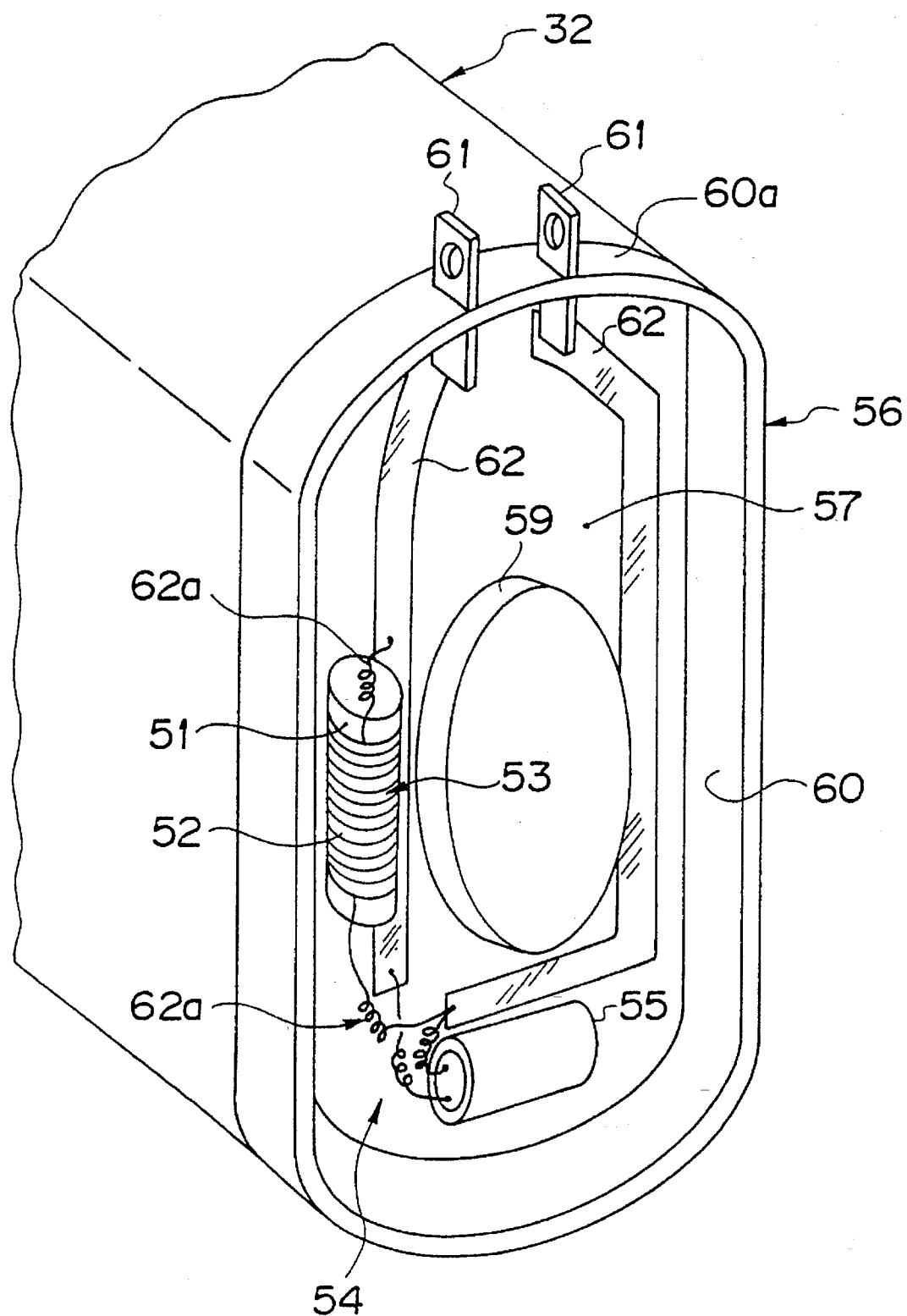
Figure 6:
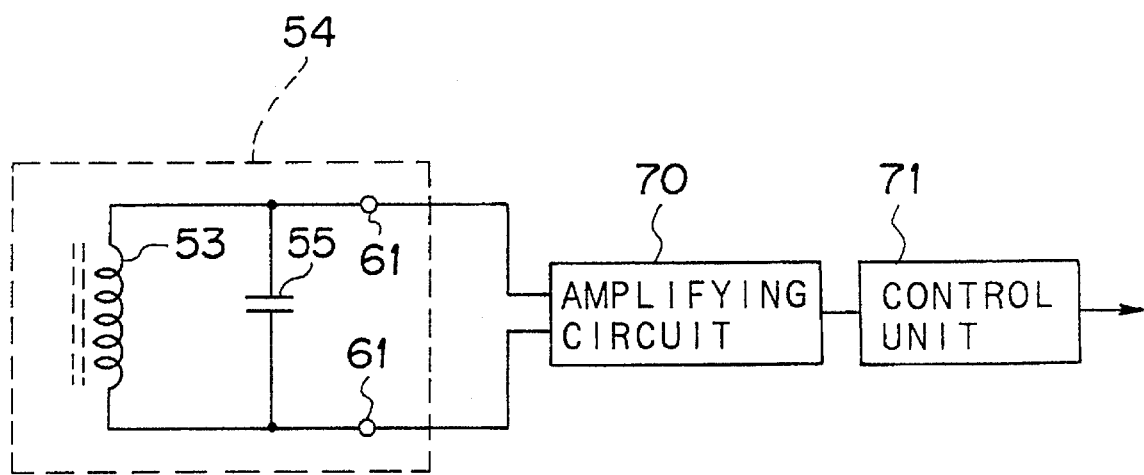

A rotation detector 50 for detecting rotating condition of the motor 21 such as sum of the rotation numbers and revolving speed thereof is detachably mounted on an outer surface of the casing 32. The rotation detector 50 is, as shown in FIGS. 2, 5 and 6, provided with an inductor 53 formed by coiling a copper wire 52 around a ferrite core 51 and a capacitor 55 constituting a resonance circuit in connection with the inductor 53. The rotation detector 50 provides a unit structure in which the resonance circuit is accommodated in a sensor case 56.

In the illustrated embodiment, a parallel resonance circuit 54, in which the capacitor 55 is parallelly connected to the inductor 53, is adapted as the resonance circuit. Electric signals generated from the parallel resonance circuit 54 are amplified by an amplifying circuit 70 and then transmitted to a control unit 71 connected to the amplifying circuit 70.

As shown in FIGS. 3 and 5, the inductor 53 and the capacitor 55 are fixed by a bonding agent on a bottom plate 57 of the sensor case 56. The sensor case 15 has a hollow box-shaped structure formed out of an electrically insulating material. As described before, the end portion 39 of the housing 34 is protruded outward so as to provide the recessed portion 40, and as a result a protruded portion 58 is formed at the end portion 39. Thus the bottom plate 57 is integrally formed with a central recessed portion 59 corresponding in shape to the protruded portion 58.

A side plate 60 of the sensor case 56 is integrally formed with the bottom plate 57. The side plate 60 has a shape corresponding to the shape of the housing 34. The side plate 60 has an upper plate portion 60a to which a pair of connecting terminals 61 are fixed so as to extend outward of the casing 32. The bottom plate 57 is formed as a printed circuit board on which a copper foil circuit pattern 62 is formed. The parallel resonance circuit 54 electrically connected by the soldered lead wires 62a and the circuit pattern 62 is arranged on the bottom plate 57.

When an end cover 63 is applied to the side plate 60, an interior of the sensor case 56 can be tightly closed as shown in FIG. 2. This end cover 63 is removed in the illustration of FIG. 5.

As described before, the protruded portion 58 of the housing 34 can be fitted into the recessed portion 59 of the sensor case 56. Consequently, the sensor case 56 can be secured tightly to an outer end surface 65 of the axial end portion 39 of the housing 34.

The inductor 53 serves to detect magnetic fluxes leaking externally from the casing 32 among the magnetic fluxes created by mutual operations of the permanent magnets 31 and the armature 43 of the rotor 33 rotating inside the permanent magnets 31. The inductor 53 then converts the change of the leaking magnetic fluxes into electric signals.

A resonance frequency $f_0$ of the parallel resonance circuit 54 is made so as to correspond to a value of a frequency f to be generated for a rotating time when the armature 43 is rotated. The parallel resonance circuit 54 outputs these electric signals represented by wave form. It is desired that the resonance frequency $f_0$ is substantially coincident with the generated frequency f, but it may be set to have a value within a range of 1 to 1.5 times that of the generated frequency f. It is necessary to fix the resonance circuit 54 to the outer surface of the casing 32, and it is desired to fix the same to the outer end surface 65 of the casing 32 on the side opposite to the side on which the commutator 44 is arranged. In the embodiment, the parallel resonance circuit 54 is fixed to the outer surface of the end portion 39 of the housing 34.

As shown in FIG. 3, when a motor driving current is conducted to the armature 43 from the connecting terminals 46 through the brushes 45 and the commutator 44, a rotating force is imparted to the armature 43 disposed in the magnetic field generated by the paired permanent magnets 31. The rotor 33 is hence rotated, whereby the rotation shaft 24 is rotated and the actuator 20 (see FIG. 1) is driven. The motor driving current applied to the connecting terminals 46 can be subjected to a PWM (pulse width modulation) control by a PWM modulation circuit 80. The PWM modulation circuit 80 generates the driving current having a pulsed voltage and modulates a pulse width of a pulsed voltage wave form of the driving current.

The principle or means for detecting the change of the leaking magnetic fluxes will be described hereunder in detail.

The magnetic fluxes are generated by a pair of permanent magnets 31 and the armature 43 rotated inside the permanent magnets 31. A portion of the magnetic fluxes leaks externally from the casing 32 as the leaking magnetic fluxes which are changing in accordance with the rotation of the armature 43. Consequently, if a magnetic flux direction of the ferrite core 51 coincides with the leaking magnetic flux direction, the inductor 53 is crossed with the leaking and changing magnetic fluxes. As a result, a self-induction for inducing an electromotive force to the inductor 53 itself is induced by an electromagnetic induction and the electric signals are caused to the inductor 53.

Regarding the position and direction of the inductor 53 (see FIG. 4), suppose that one direction (upper direction) of a line E is 0(zero)-angled position and another direction (left-hand direction) perpendicular to the line E is 90-angled direction. It is desired that the inductor 53 is located to a position at which the leaking magnetic fluxes are maximum. As a result, the output of the electric signals from the parallel resonance circuit 54 is also made large. The line E connects the central positions of the respective permanent magnets 31. It is desired to locate a center P of the inductor 53 in a range of 90°± 50° (in the range of angle θ). For example, by locating the center P of the inductor 53 at 90° direction and directing the ferrite core 51 to a direction parallel to the line E, i.e. vertical direction in FIG. 4, the output of the induced electric signals is made maximum.

The resonance frequency $f_0$ of the resonance circuit which is provided with the inductor 53 having an inductance L and the capacitor 55 having a capacitance C will be expressed by following equation (1).

$$f0 = \frac{1}{2\pi \sqrt{LC}} \quad (1)$$

On the while, when the rotor 33 having a plurality of slots is rotated at its upper limit revolving speed (RPM), the frequency f with which the leaking magnetic fluxes are changing will be expressed by following equation (2). The pulse number per one rotation corresponds to the numbers N of the slots.

$$f = N \times [\text{Upper Limit Revolving Speed(RPM)}]/60 \quad (2)$$

As shown in following equation (3), by constituting the resonance frequency $f_0$ of the resonance circuit so as to be substantially coincident with the generated frequency f, the magnitude of the wave form of the electric signals transmitted from the resonance circuit is made large and a wave form shaping of the electric signals can be done. The resonance circuit can also act as a filter filtering off unnecessary noises so as not to generate these noises, thus a good SN (signal/noise) ratio can be obtained.

$$f_0 \approx f \quad (3)$$

A sparking of commutation generated between the commutator 44 and the brushes 45, PWM modulation or a high-frequency noise such as external noise will be considered as these noises. In this embodiment, the rotation detector 50 provided with the parallel resonance circuit 54 is secured to the outer end surface 65 of the casing 32 at the most apart portion from the location of the commutator 44 as shown in FIG. 3. Therefore, an influence by the sparking of commutation can be reduced.

In the conventional art, a contact-type rotation detector is incorporated in a miniature D.C. motor, but in this embodiment of the invention, the rotation detector 50 is secured to the outer end surface 65 of the casing 32. As a consequence, it is not necessary to essentially change the design of the motor 21 itself and the entire axial length of the motor can be made short without reducing the performance of the motor itself. Further, the structure of the motor can be made simple.

In the conventional art, it is necessary to embed the lead wires for the rotation detector in the casing. There is therefore a fear of invading water into the motor through the embedded portion of the lead wires. In this view point, according to the invention, the lead wires 62a and the circuit pattern 62 of the rotation detector 50 are arranged externally of the casing 32. Thus the rotation detector 50 does not affect the motor 21 itself and the water-proof property can be improved.

In a case only when it is required to detect the rotating condition of the motor 21, the closed unit-type rotation detector 50 may be secured to the outer surface of the casing 32. Therefore, the structure of the motor 21 itself is not changed at all and a common motor can be utilized regardless of the presence or absence of the rotation detector 50.

In the conventional arrangement, a space S (see FIG. 3) between the surface constituted by the outer end surface 65 of the motor and the surface constituted by the outer end surface 58a of the protruded portion 58 cannot be utilized because of a dead space, but according to the invention, this space S can be utilized for detachably disposing the rotation detector 50, thus being advantageous.

In the invention, the rotating condition of the motor 21 can be detected through the non-contact type structure with no sliding portion, so that there is no portion or part which is mechanically moved. Therefore, it hardly causes any fault or trouble resulting from the mechanical problem, thus prospective life of the motor 21 itself is elongated.

FIGS. 7 through 16 are graphs regarding the operational data of the rotation detector 50 of the motor 21 according to the invention.

The graphs of the data in FIGS. 7 through 11 are based on the following conditions that the miniature D.C. motor 21 is driven.

Figure 7:
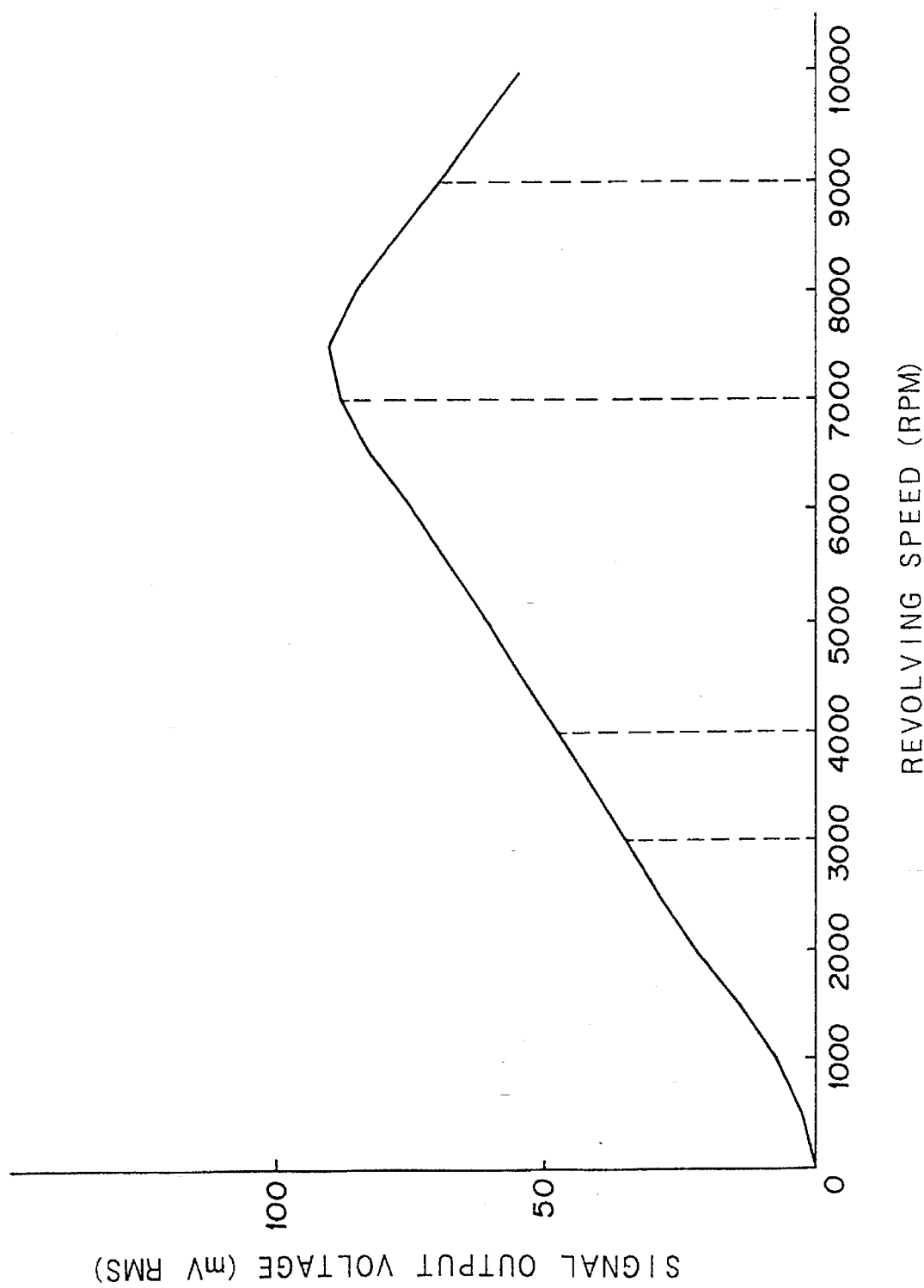
Figure 8:
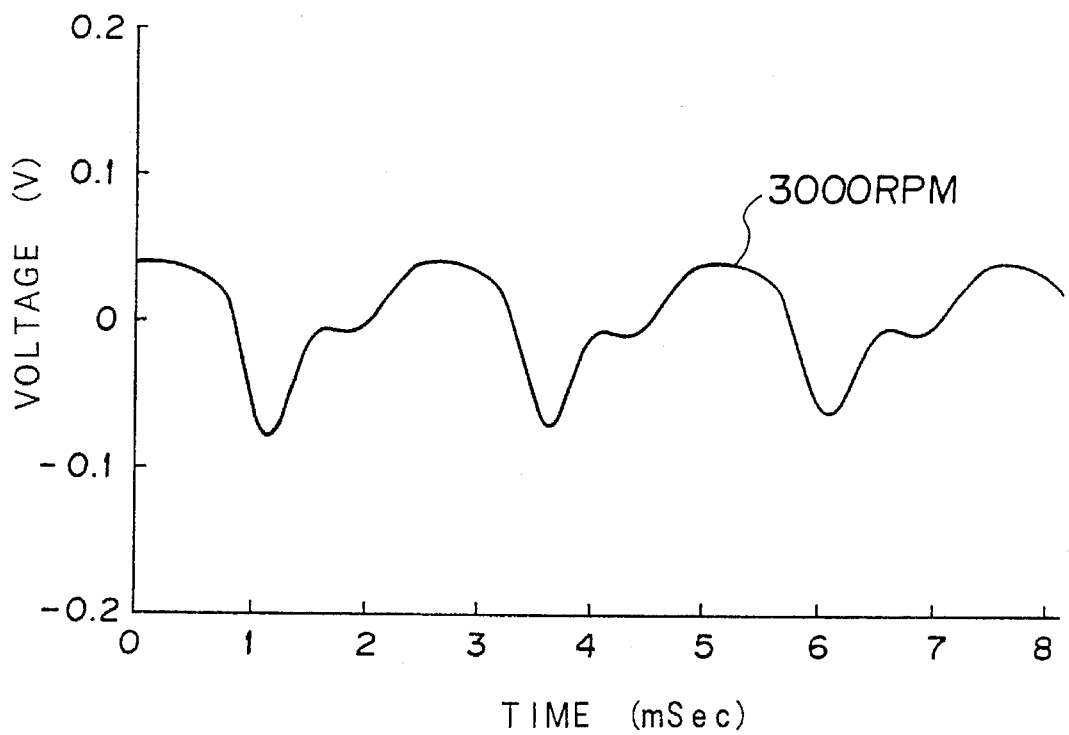
Figure 9:
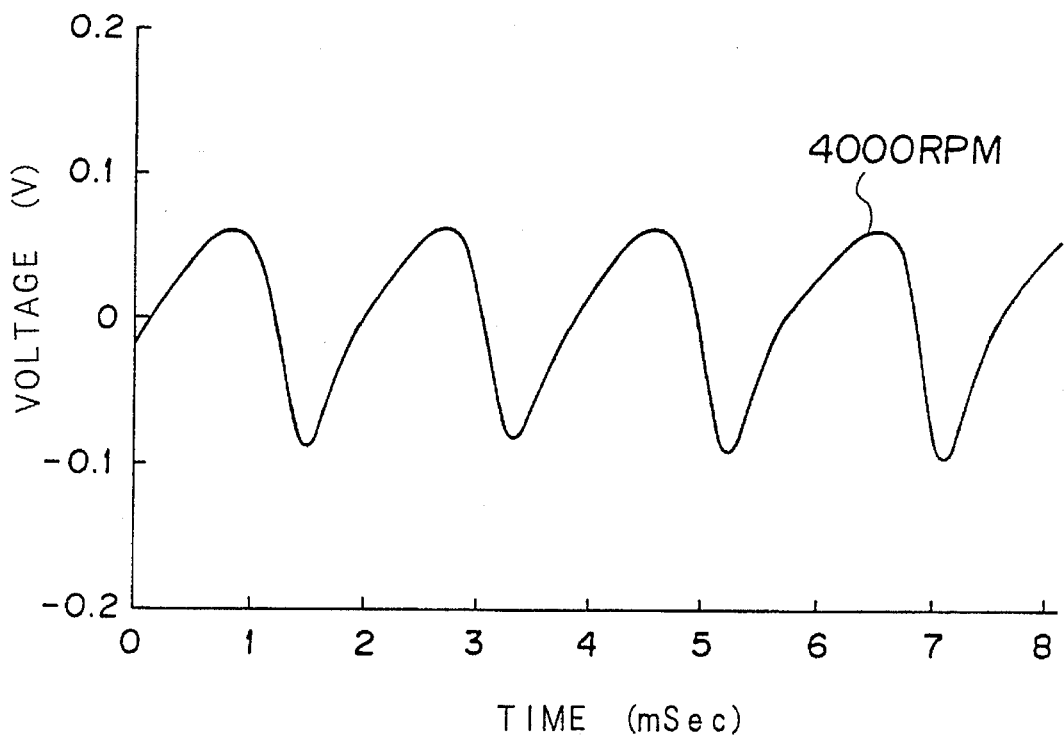

(1) Pole numbers and slot numbers:
Two poles and eight slots (2) Pulse numbers per one rotation of motor 21:
Eight pulses/REV (3) Inductance L of inductor 53: 4.8 mH (4) Capacitance C of capacitor 55: 4.7 μF (5) Condition of motor 21: Unloaded condition (6) PWM modulation of motor driving current: No FIG. 7 is a graph relating the relationship between the revolving speed of the motor 21 and the signal output voltage. The abscissa represents the revolving speed (RPM) and the ordinate represents an effective value of the signal output voltage (mV RMS (root-mean-square)). FIGS. 8 through 11 represent the wave form of the electric signals generated from the parallel resonance circuit 54 at the times of revolutions of 3000, 4000, 7000 and 9000 RPM respectively.

Figure 10:
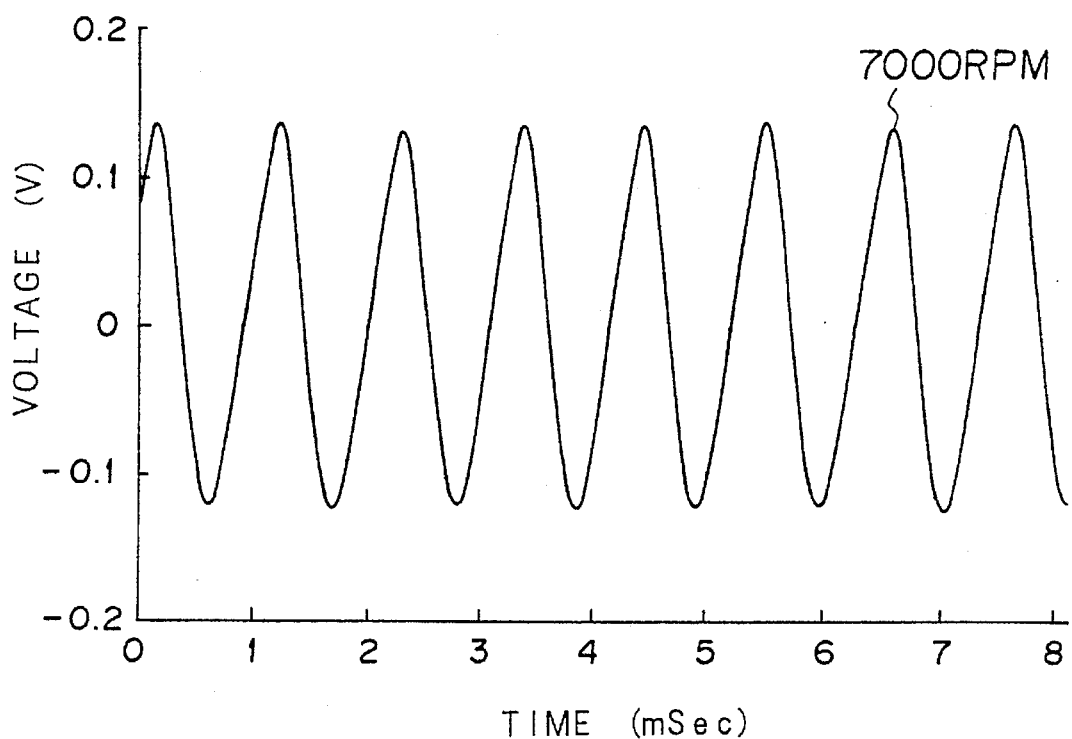
Figure 11:
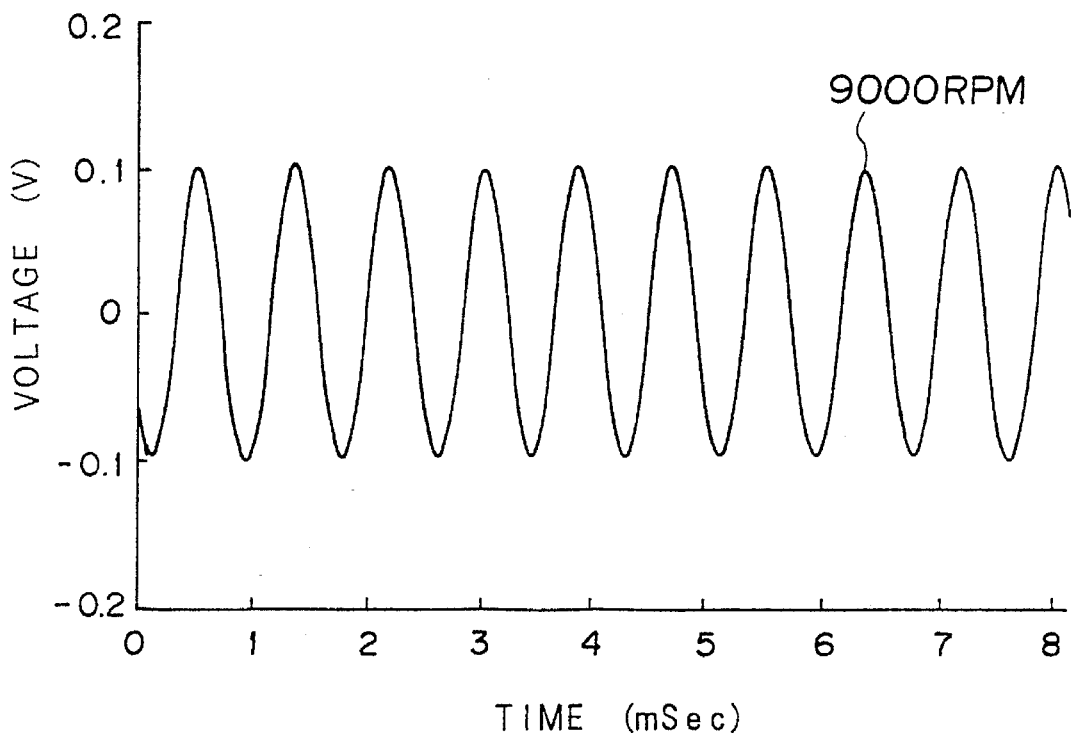

Under the conditions (1) through (6), the resonance frequency $f_0$ is about 1060 Hz from equation (1). In the case where this resonance frequency $f_0$ is substantially coincident with the generated frequency f as shown in equation (3), the upper limit revolving speed for use of the motor 21 is about 7950 RPM from equation (2). Consequently, as shown in FIG. 7, the signal output voltage becomes maximum at the revolving speed of the motor near the above-mentioned upper limit revolving speed. As shown in FIG. 10, the signal output voltage is represented by the sine wave having large magnitude and no noise. Thus the output signals having the shaped wave form and being easily calculated with high power can be obtained.

Figure 12:
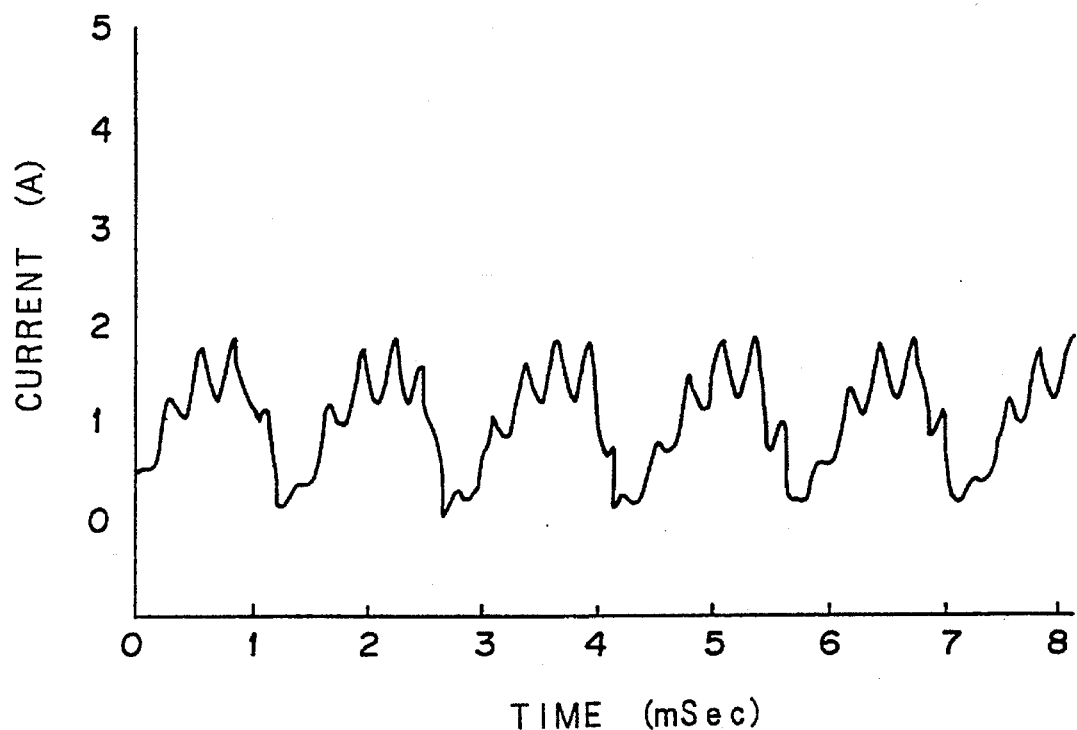
Figure 13:
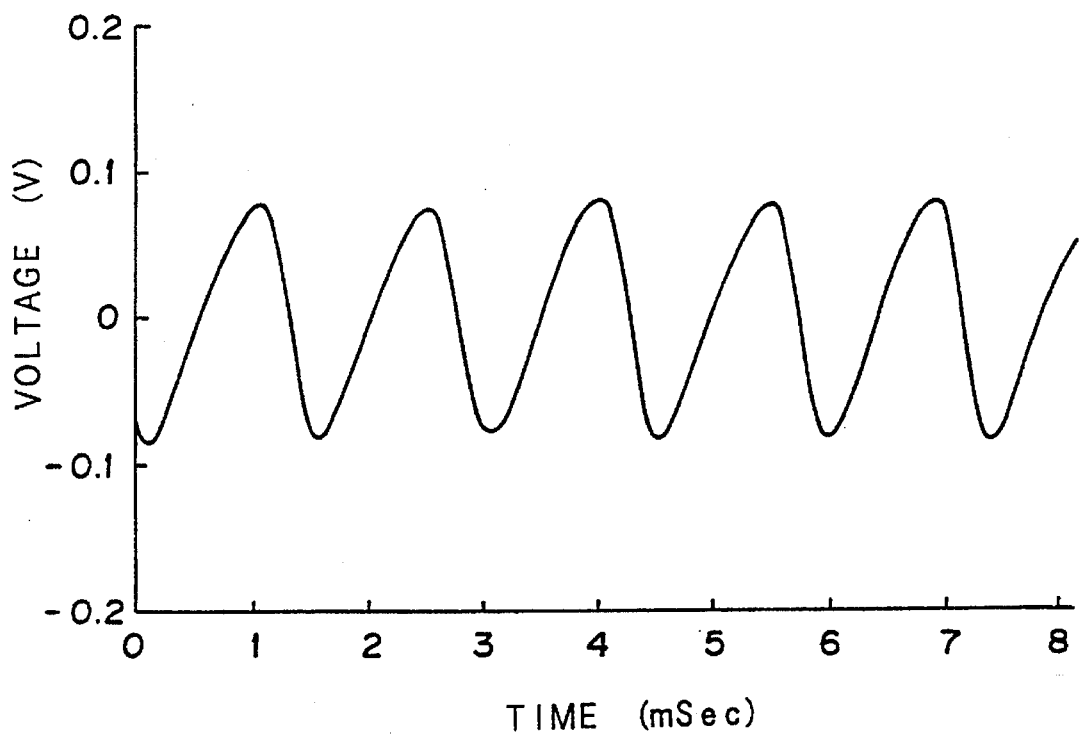
Figure 14:
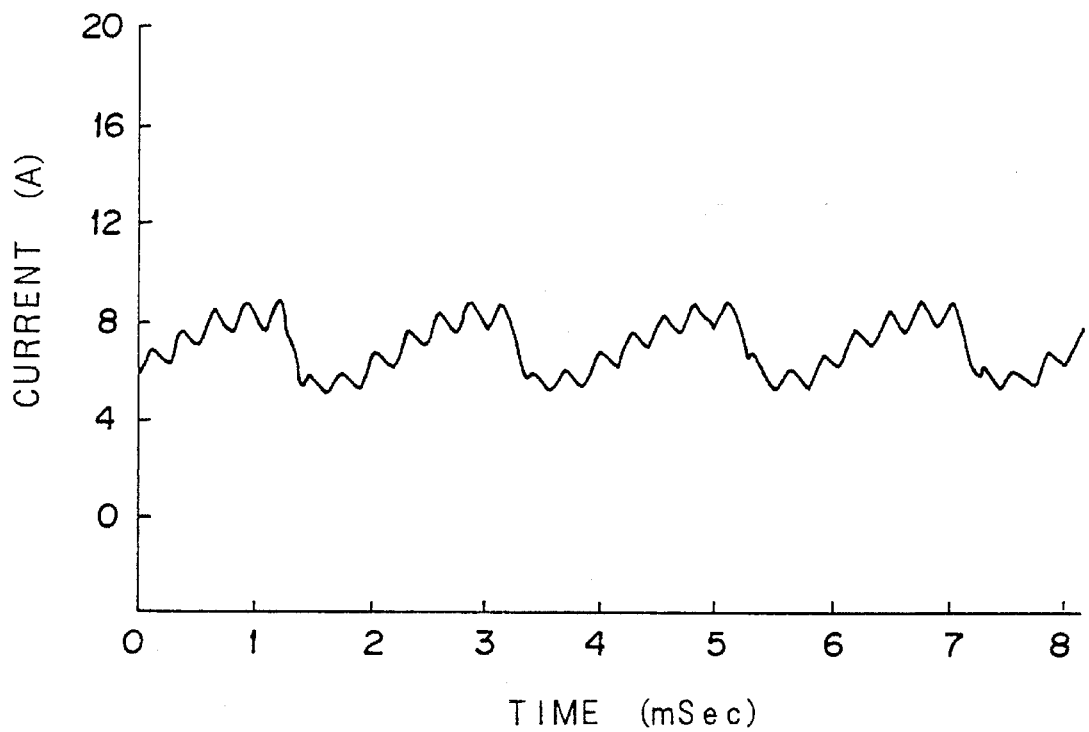
Figure 15:
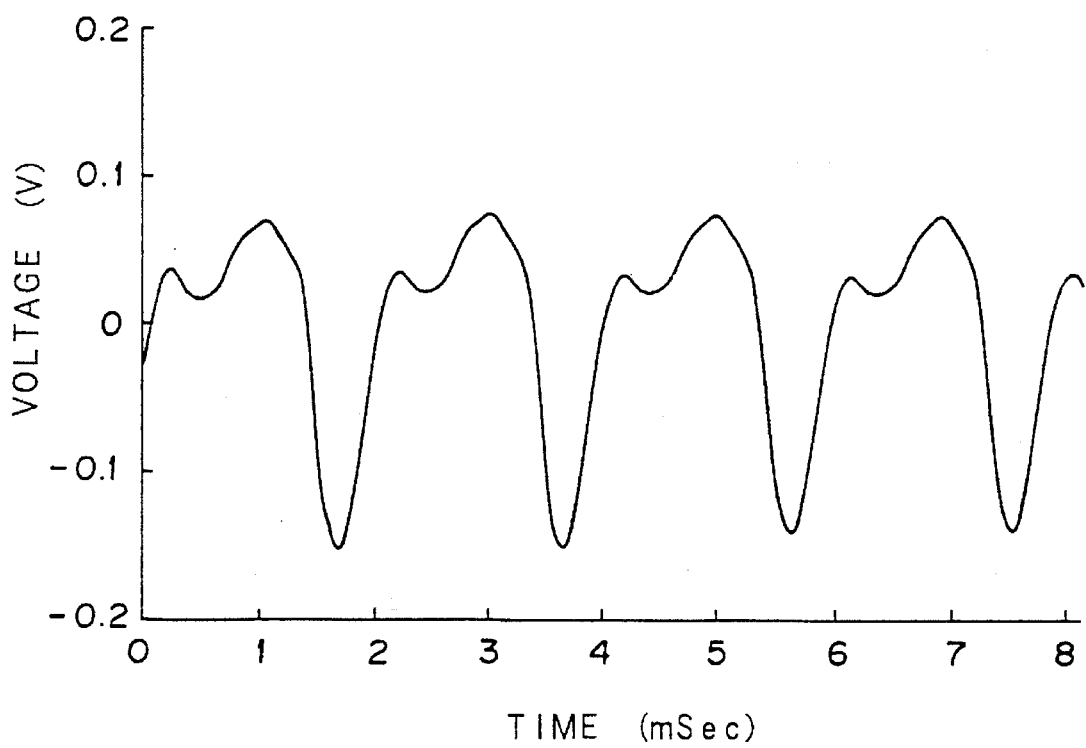

FIGS. 12 and 13 show the cases in which the motor driving current is PWM modulated under unloaded condition of the motor 21. FIG. 12 shows a wave form of the motor driving current and FIG. 13 shows a wave form of the output signals from the parallel resonance circuit 54. FIGS. 14 and 15 show the cases in which the motor driving current is PWM modulated under the loaded condition of the motor 21. FIG. 14 shows a wave form of the motor driving current and FIG. 15 shows a wave form of the output signals from the parallel resonance circuit 54.

As seen from FIGS. 12 and 14, when the motor driving current is modulated under the PWM control, the wave forms of the current are shown as saw-tooth-waves. However, as shown in FIGS. 13 and 15, the wave forms of the signals detected by the inductor 53 and generated by the parallel resonance circuit 54 include no noise of the PWM control. As a result, the signals having wave form with no noise can be generated even if the motor 21 is driven by the PWM control.

According to this embodiment, the parallel resonance circuit 54 acts as a filter filtering off the noises and the signals from which these noises have been removed are transmitted to the control unit 71 through the amplifying circuit 70. Therefore, the control unit 71 inputted with the signals calculates the revolving speed and the sum of the revolution as the rotation condition. The control unit 71 discriminates an exact position of the window glass of the power window and the opening and closing speeds of the window glass, and thereby exactly controls them.

For example, in a case when a hand or a neck of a person is nipped between the window glass and the window frame while the window glass is closing, the closing speed thereof is hence reduced or stopped. Such a state of emergency can be discriminated by the control unit 71 through the signals detected from the rotation detector 50. In response to a command from the control unit 71, the closing operation of the window glass is stopped or reversed instantly, and thereby prevents an accident.

FIG. 16 is a graph showing the relationship, based on FIG. 4, between the setting angle of the inductor 53 and the signal relative output (%). The signal relative outputs are shown at the inductor setting angles in the case of the signal relative output of 100% where the inductor 53 is arranged at 90° position as shown in FIG. 4 and the motor 21 is driven with unloaded condition. As shown in FIG. 16, when the inductor 53 is arranged at (90°–50°, that is, 40°) position, the relative output becomes about 70% in comparison with the 90° position. Therefore, it is found that the desired setting angle of the inductor 53 is within the range θ of 90°±50°. In this angle range θ, the inductor 53 is positioned in the optimum leaking field of the magnetic fluxes and a large output voltage can be hence obtained. It is to be noted that, even apart from this angle range, a desired output voltage will be obtained by making large a gain of a signal processing circuit (not shown).

As shown in FIG. 2 with chain lines, the rotation detector 50 may be mounted on the outer surfaces of the flat portion 38 or the cylindrical portion 37 of the casing 32.

Further, the inductor 53 may be formed only by winding the copper wire 52 without using the ferrite core 51 as a hollow cylindrical coil structure. By using the ferrite core 51 the inductance can be made large, and as a result a resonance point is easily set to a low frequency and the inductor 53 can be made small. The parallel resonance circuit 54 may be substituted by a series resonance circuit.

In the embodiment, there is a case in which the motor 21 having the rotation detector 50 is applied to the actuator 20 for the power window of the automobile. The rotation detector may be applied to a miniature D.C. motor utilized for another-type of actuator for which the control of the revolving speed or the like is required.

It is for sure to be noted that like reference numerals in the respective figures denote the same elements or members.

Those skilled in the art will appreciate that a variety of changes and modifications to the present invention can be made without departing from the spirit and scope of the invention as defined by the appended claims.

What is claimed is:

1. A miniature D.C. motor, comprising:

a casing in which a magnet means is disposed, said casing having an end portion with a protruded portion;

a rotor having a rotation shaft and disposed inside the magnet means to be rotatable, and a rotation detector detecting a rotation condition of the rotor, wherein said rotation detector comprises:

a rotation detector casing;

an inductor means for detecting magnetic fluxes leaking externally from the casing among the magnetic fluxes created by mutual operations of the magnet means and an armature of the rotor and for converting a change of the leaking magnetic fluxes into electric signals, and a capacitor means electrically connected to the inductor means so as to constitute a resonance circuit means, said resonance circuit means being mounted on an outer surface of the casing, wherein a resonance frequency of the resonance circuit means is made so as to correspond to a value of a frequency to be generated for a rotating time of the armature, and wherein said rotation detector casing has a bottom plate formed with a recessed portion for accommodating therein said protruded portion of said casing of said motor.

2. A miniature D.C. motor according to claim 1, wherein the resonance circuit means is composed of a parallel resonance circuit in which the inductor means and the capacitor means are connected in parallel to each other and the resonance frequency is set to have a value within a range of 1 to 1.5 times that of the generated frequency.

3. A miniature D.C. motor according to claim 2, wherein the resonance frequency is substantially coincident with the generated frequency.

4. A miniature D.C. motor according to claim 1, wherein the rotation detector has a unit structure to be detachably mounted on the outer surface of the casing.

5. A miniature D.C. motor according to claim 4, wherein the casing has axial two end portions and the rotation detector is mounted on an outer end surface of one of the end portions opposite to another side at which a commutator is mounted to the rotation shaft.

6. A miniature D.C. motor according to claim 1, wherein the electric signals generated by the resonance circuit means are amplified by an amplifying circuit connected to the resonance circuit means and then transmitted to a control unit connected to the amplifying circuit.

7. A miniature D.C. motor according to claim 1, wherein said inductor means and said capacitor means are fixed on a bottom plate of a sensor case having a hollow box-shaped structure formed out of an electrically insulating material.

8. A miniature D.C. motor according to claim 1, wherein said magnet means is composed of a pair of permanent magnets mounted on an inner peripheral surface of the casing, each of said permanent magnets being formed in an arc segment shape and being formed out of a magnetic material such as hard ferrite.

9. A miniature D.C. motor according to claim 8, wherein a center of said inductor means is disposed to an angled position in a range of 90°±50° in a case where one direction of a central line connecting centers of the respective permanent magnets is assumed as 0(zero)-angled position and another direction normal to this one direction is assumed as 90-angled position.

10. A miniature D.C. motor according to claim 9, wherein said inductor means is arranged in the 90-angled position, and wherein the inductor means includes a ferrite core which is directed to a direction parallel to the central line connecting the centers of the permanent magnets.

11. A miniature D.C. motor according to claim 1, wherein a motor driving current applied to the miniature D.C. motor is subjected to a pulse width modulation control by means of a pulse width modulation circuit.

12. A miniature D.C. motor according to claim 1, wherein said inductor means is composed of a ferrite core and a copper wire wound around the ferrite core.

13. A miniature D.C. motor according to claim 1, wherein said inductor means is composed of a copper wire wound so as to provide a hollow cylindrical structure.

14. A miniature D.C. motor according to claim 1, wherein the rotation detector is mounted to the miniature D.C. motor for an actuator for which a control is required by detecting the rotating condition of the rotor.

15. A miniature D.C. motor according to claim 14, wherein said actuator is utilized for a power window of an automobile.

16. A miniature D.C. motor according to claim 1, wherein said casing comprises a bottomed hollow cylindrical housing having an opening and a cover member applied to the opening of the housing, said cover member being formed out of an electrically insulating material.

17. A miniature D.C. motor according to claim 16, wherein said housing is integrally formed by means of a press molding.

18. A miniature D.C. motor according to claim 16, wherein said housing and said cover member are provided with a pair of cylindrical portions and a pair of flat portions which are parallel to each other and are integrated with the cylindrical portions respectively, and a pair of permanent magnets constituting the magnet means are mounted on inner peripheral surfaces of the cylindrical portions.

19. A miniature D.C. motor according to claim 16, wherein said housing has an axial one end to a central portion at which a recessed portion is formed so as to protrude externally at its bottom, a bearing is accommodated in the recessed portion, said cover member has a central portion to which the other bearing is mounted, and the rotation shaft is rotatably supported by these bearings.

20. A miniature D.C. motor according to claim 19, wherein said inductor means and said capacitor means are secured to a bottom plate of a sensor case of a hollow box-shape structure formed out of an electrically insulating material, an externally protruded portion so as to form the recessed portion is integrally formed at the central portion of the axial one end portion of the housing, and another recessed portion is integrally formed at a central portion of the bottom plate of the sensor case so as to have an inner shape corresponding to an outer shape of the protruded portion of the housing, whereby the sensor case is firmly secured to the outer end surface of the axial one end portion of the housing by fitting the protruded portion of the housing into the recessed portion of the bottom plate of the sensor case.

21. A miniature D.C. motor according to claim 20, wherein a side plate integrated with the bottom plate of the sensor case has an outer shape corresponding to a shape of the housing, the side plate has an upper side section to which a pair of connecting terminals are fixed so as to extend externally, said bottom plate of the sensor case is formed as a printed circuit board on which a copper foil circuit pattern is printed, said resonance circuit being electrically connected by soldered lead wires and the circuit pattern printed thereon, and an interior of the sensor case is tightly closed by applying a cover member to the side plate.

22. A miniature D.C. motor according to claim 1, wherein said casing comprises a bottomed hollow cylindrical housing having an opening and being formed out of a steel material and a cover member to be tightly fitted to the opening of the housing, said cover member being formed out of an electrically insulating material, said housing having an axial one end to a central portion at which a recessed portion is formed so as to protrude externally at its bottom as a protruded portion, a bearing supporting a rotation shaft of the rotor is accommodated in the recessed portion, said rotation detector is constructed to be a sealed unit in which said resonance circuit is accommodated and is detachably mounted on an outer surface of the axial end portion of the housing, said rotation detector being provided with a sensor case having a bottom plate at a central portion at which a recessed portion fitting in said protruded portion is formed, said sensor case is tightly mounted on the outer surface of the axial end portion of the housing, said sensor case having an outer shape corresponding to an outer shape of the housing, said magnet means is composed of a pair of permanent magnets oppositely mounted on an inner peripheral surface of the housing, each of said permanent magnets being formed out of a magnetic material such as hard ferrite so as to provide an arc segment shape, said resonance circuit is formed as a parallel resonance circuit in which the inductor means and the capacitor means are connected in parallel to each other, said inductor means being composed of a ferrite core and a copper wire wound around the ferrite core in coil shape, said parallel resonance circuit having the resonance frequency being substantially coincident with the generated frequency, and in a case where one direction of a central line connecting centers of the respective permanent magnets is assumed as 0-angled position and another direction normal to this one direction is assumed as 90-angled position, said inductor means is arranged in the 90-angled position and the ferrite core of the inductor means is directed to a direction parallel to the central line connecting the centers of the permanent magnets.

23. A miniature D.C. motor, comprising:
 a casing in which a magnet means is disposed, said magnet means being composed of a pair of permanent magnets mounted on an inner peripheral surface of the casing, each of said permanent magnets being formed in an arc segment shape and being formed out of a magnetic material such as hard ferrite;
 a rotor having a rotation shaft and disposed inside the magnet means to be rotatable; and
 a rotation detector detecting a rotation condition of the rotor, wherein said rotation detector comprises:
  an inductor means for detecting magnetic fluxes leaking externally from the casing among the magnetic fluxes created by mutual operations of the magnet means and an armature of the rotor and for converting a change of the leaking magnetic fluxes into electrical signals, and a capacitor means electrically connected to the inductor means so as to constitute a resonance circuit means, said resonance circuit means being mounted on an outer surface of the casing, wherein a resonance frequency of the resonance circuit means is made so as to correspond to a value of a frequency to be generated for a rotating time of the armature, wherein a center of said inductor means is arranged in a 90°-angled position in a case where one direction of a central line connecting centers of the respective permanent magnets is a 0°-angled position and another direction normal to the one direction is a 90°-angled position, and wherein the inductor means includes a ferrite core which is directed to a direction parallel to the central line connecting the centers of the permanent magnets.

* * * * *